Dec. 15, 1936.                M. N. RUSSELL                2,064,083
                      MOUNTING FOR WIRING DEVICES
                          Filed Aug. 6, 1934
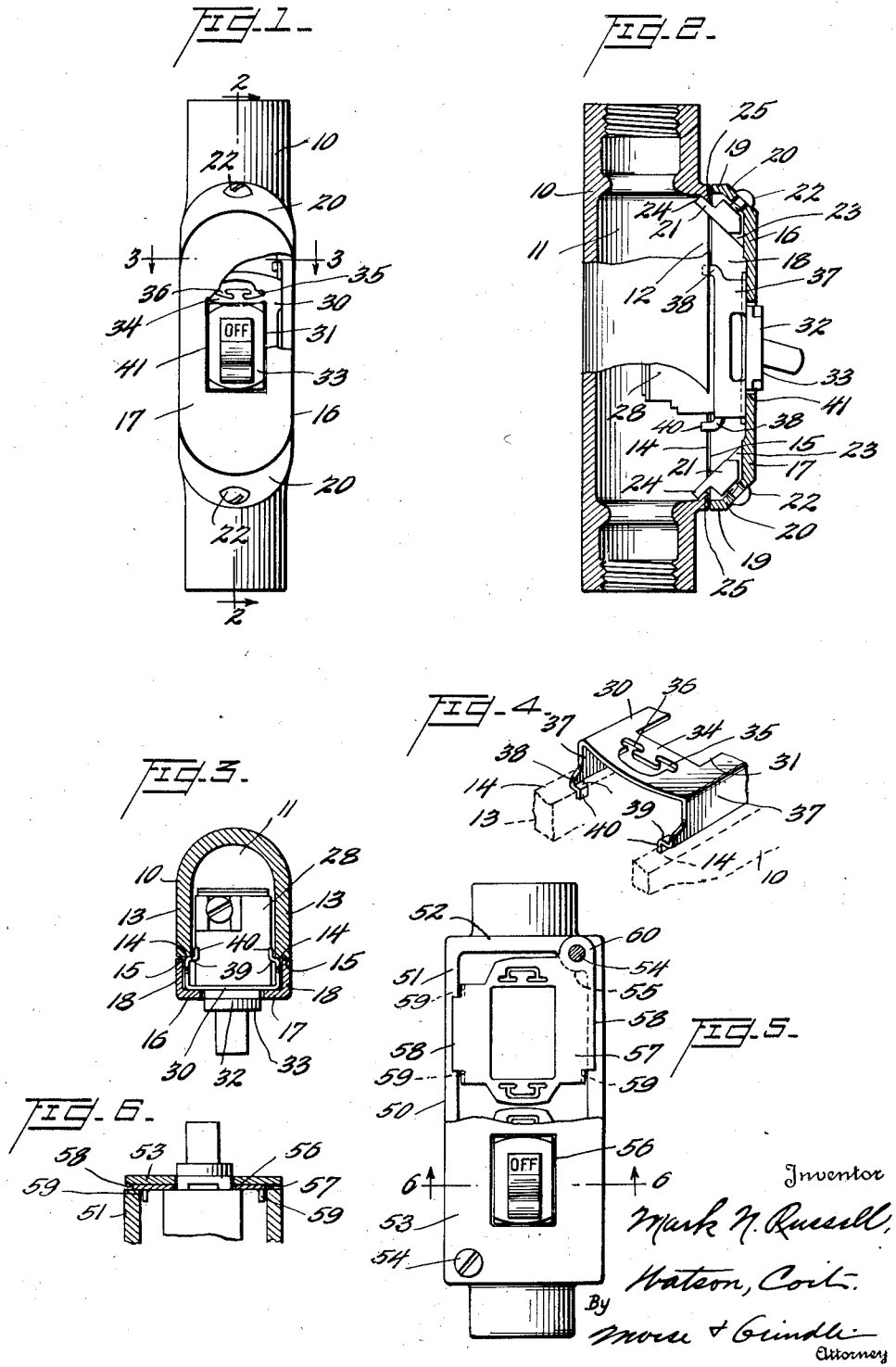

Patented Dec. 15, 1936

2,064,083

UNITED STATES PATENT OFFICE.

2,064,083

MOUNTING FOR WIRING DEVICES

Mark N. Russell, Syracuse, N. Y., assignor to Pass & Seymour, Inc., Syracuse, N. Y., a corporation of New York Application August 6, 1934, Serial No. 738,739

6 Claims. (Cl. 247—20)

This invention relates to electric wiring equipment and more particularly to the combination of and means for assembling a condulet similar fitting and one or more wiring devices such as switches, convenience outlets and the like.

It is a general object of the present invention to provide novel and improved electric wiring equipment.

More particularly it is an object of the invention to provide in the combination of a condulet and-cover with a wiring device of mounting means held between the condulet and cover for supporting the wiring device therein preferably without the use of direct fastening means between the wiring device and condulet.

An important feature of the invention resides in the provision of a mounting plate or strap which can be readily attached to any one of various purpose wiring devices, which serves to center and position the attached device in the interior of a condulet with an operative portion thereof exposed through an opening in the cover of the condulet.

Another important feature consists in the arrangement and construction of the mounting strap or plate whereby it is clamped between the condulet and the condulet cover in such a manner as to firmly position the wiring device in the condulet without the use of fastening means other than those used to secure the condulet cover in position.

Other and further features and objects of the invention will be more apparent to those skilled in the art upon a consideration of the accompanying drawing and following specification wherein are disclosed several exemplary embodiments of the invention with the understanding that various changes may be made therein such as fall within the scope of the appended claims without departing from the spirit of the invention.

In the drawing:

Figure 1 is a front elevation of an assembled wiring device condulet and condulet cover, a portion of the cover being broken away to illustrate certain interior construction;

Figure 2 is a vertical central section on line 2—2 of Figure 1 showing the wiring device and its mounting strap in elevation and with a portion of the near side wall of the condulet in position;

Figure 3 is a transverse section taken on line 3—3 of Figure 1 looking in the direction of the arrows;

Figure 4 is a fragmentary perspective view showing the mounting strap engagement with the condulet body;

Figure 5 is a front elevation of an assembled condulet and cover of larger size and somewhat different construction showing a wiring device in position and with a portion of the cover broken away to show a second mounting strap in position; and Figure 6 is a transverse section on line 6—6 of Figure 5.

In wiring such buildings or parts thereof which do not require the concealed type conduit equipment, and particularly factory buildings, shops, warehouses, and even the cellars and attics of residences, it is the practice to insert switches, convenience outlets and and the like in exposed junction and terminal boxes in the conduit system, for the control of lights and other equipment and for the provision of power for portable equipment. Heretofore, a rectangular box as large as a so-called "single gang" box, or a 3¼" to 4" circular or octagonal box has been required for the reception of a single switch, a single or duplex convenience outlet, a pilot light or similar wiring device. In accordance with the present invention means is provided for equipping a standard condulet of ½" or larger size with one or more wiring devices of the type mentioned without requiring any changes in the standard construction of these condulets.

It is to be appreciated that condulets are of various sizes and types, but the present invention is independent to a large extent of the type and size and is useful with condulets of single conduit opening, double conduit opening, angle condulets, and the like.

The invention is illustrated in Figures 1 to 4 inclusive in conjunction with a ½" Type C condulet equipped to receive a single wiring device. The construction of the wiring devices themselves forms no part of the present invention and is illustrated for instance in Reissue Patent 19,092, granted to Victor R. Despard. The switch illustrated in the instant application is specifically disclosed in Patent 1,948,399, granted to M. N. Russell et al., and a convenience outlet in Design Patent 89,684, granted to Victor R. Despard. Obviously other types of wiring devices can be used with equal facility provided they are of the requisite small dimensions to be received within the interior of a condulet.

Referring now to Figures 1 to 4 inclusive of the drawing, a ½" Type C condulet is illustrated at 10 as having the chamber 11, access to which is obtained through the front opening 12 which is of substantially the same width as the maximum interior width of the chamber as defined by the side walls 13. The front edges of these side walls, and the continuations thereof at the ends, form the front face 14 which lies substantially in a plane and serves to receive the edges 15 of the cover 16 which can be secured over the opening to close the chamber.

This cover is preferably of considerable depth and includes the thin top 17, the depending side flanges 18 and the end flanges 19 connected to the top by a chamfered or conical portion 20. Fastening lugs 21 are loosely positioned beneath these conical portions, each by means of a screw 22 passing through that portion and into the lug. The lugs are kept from rotating by being loosely received between ribs 23 formed integral with the cover. The extensions 24 on the lugs are receivable beneath the overhanging edges 25 at the ends of the opening in the condulet and when the screws are tightened the lugs serve to clamp the cover flanges tightly down against the surface 14 as will be appreciated from an examination of Figure 2.

The wiring device illustrated herein includes operating mechanism housed within a block 26 of insulating material. In accordance with the type of device, this may be of varying widths and lengths, but in every case is less in width than the space between the walls 13 and less in length than the length of the opening in the condulet.

For supporting the wiring device centrally in the condulet and properly spaced from all walls thereof, there is provided a mounting plate or strap 30, preferably of unitary construction, the main portion of which, in the present instance, is a flat sheet of metal apertured as at 31 to permit the passage of the neck 32 of the wiring device therethrough so that the end or face 33 of the wiring device may be exposed. Some suitable means is provided to attach the wiring device to the strap or plate and in the present instance this is illustrated by one of duplicate bendable portions 34 thereof which can, by the insertion of a screw driver successively into the openings 35 and 36, be deflected into a channel in the end wall of the neck to secure the strap to the wiring device.

Integral with and turned down from the edges of the flat portion of the strap are the side flanges 37 which are conveniently spaced apart a distance slightly greater than the distance between the walls 13 as can be seen in Figure 3. These flanges are each longer in their greatest dimension than the maximum length of any wiring device block and at their extreme ends each is provided with an integral tang 38, which tang is bent to the configuration shown in Figure 3, first providing a portion 39 parallel to the portion 30 and directed toward the other flange, and second, the portion 40 parallel to its flange and offset inwardly therefrom. The spacing between opposite portions 40 is just slightly less than the spacing between the inner faces of the walls 13, so that the four tangs by their end portions 40 serve to center the mounting strap above and the wiring device within the opening in the condulet with the portions 39 of the tangs resting firmly on the face 14 at the front of the condulet.

In this manner the wiring device is positioned against lateral movement and against movement farther into the condulet. When the cover is now applied, the neck 32 passes through the opening 41 therein and it is only necessary to slide the assembled wiring device and strap longitudinally in the opening to position it to permit the cover to be clamped into place. The distance between the front face of at least a portion of the mounting strap and the under surface of the portions 39 of the tangs is just slightly greater than the distance between the under surface of a main or auxiliary portion of the under surface of the cover, and the edges 15 which engage the face 14 on the condulet. Thus when the screws 22 are drawn up, the tangs are slightly compressed or sprung so that there is a tight clamping of them against the face 14 which prevents any subsequent longitudinal movement of the mounting strap even though there is some clearance between the aperture in the cover and the neck of the wiring device.

Figures 5 and 6 show an embodiment of the invention wherein modified mounting plates adapt wiring devices of the type disclosed in connection with Figures 1, 2 and 3 to a slightly larger type C condulet.

The condulet body 50 is subject to variations as to the number of conduits received and their direction in respect to the main part of the body but differs mainly from the one shown in the first three figures of the drawing in that it is slightly wider and has square instead of curved ends making it sufficiently long to receive two wiring devices in tandem. This form of condulet body has straight side walls 51 and end walls 52, is slightly greater in depth than the condulet of Figures 1, 2 and 3 and receives a flat metal plate 53 for a cover. This plate has the same outside dimensions as the main portion of the condulet body and is secured to the body by a pair of screws 54 in diagonally opposite corners thereof received in threaded holes in bosses 55 cast as fillets in the corners of the body.

This type of condulet, which is quite common, is adapted either for one or two wiring devices; the one shown receives two wiring devices and for the purpose two suitable apertures are provided in the cover 53 as shown at 56. Each wiring device preferably has its own independent mounting plate 57 as best seen in Figure 5. This plate instead of being elevated as that of the first embodiment is perfectly flat and is of sufficient width so that the lateral edges 58 thereof overlie the top edges of the side walls of the condulet body where they are later covered by the cover plate and held in position. The mounting plate is held centrally in the lateral direction of the box by three downturned lugs 59 which comprise portions of the parts 58. These are separated therefrom by slits and turned down at right angles so that their outer faces by cooperation with the inner walls of the sides of the condulet position the plate.

To prevent the plate from moving longitudinally in the opening in the condulet body, one corner thereof is extended to form the tab 60 which is perforated to receive one of the fastening screws for holding the cover.

The remainder of the plate particularly in regard to the fastening means for the wiring device is identical with that described in connection with the first embodiment of the invention. It is mounted in the condulet after the wiring device is secured thereto and wired and is merely set into the position shown in Figure 5 after which the cover is applied, and by the cooperation of the edges of the apertures 56 therein the plate is positioned sufficiently closely so that the cover fastening screws 54 can be inserted which hold the plate or plates where two devices are mounted in one condulet.

Obviously if it is desired to centrally mount only a single wiring device in this second form of condulet the mounting plate differs from that shown by having the tab 60 sufficiently elongated to position the wiring device centrally in the length of the condulet and the cover plate is apertured for this purpose although in some cases it may be found desirable and suitable to mount a single wiring device near one end of the condulet such as one of those shown in Figure 5. It is conceivable that to permit of this use the cover plates could be made with one aperture fully open and the other closed by a knock-out which could then be removed if it were to be used for two wiring devices.

The arrangements just described, by virtue of the interchangeability of wiring devices within the mounting strap or straps, permit the use of a wide range of devices in the conventional condulets and materially simplify and facilitate wiring of the type of buildings previously referred to.

Having thus described the invention, what is claimed as new and desired to be secured by Letters Patent is:

1. A wiring assembly including, in combination, a condulet, a wiring device having its major portion within but out of contact with said condulet, a sheet metal mounting plate secured to said device and engaging within the side walls of the condulet to prevent lateral movement of the device and engaging the forward edges of the side walls to limit inward movement thereof, an apertured cover plate secured over the opening in the condulet, said cover plate engaging the mounting plate and clamping it to said side walls, said device being accessible for use through the cover plate aperture.

2. A wiring assembly including, in combination, a condulet body having an opening surrounded by a front face, a wiring device including an insulation block partially in but out of contact with said condulet, a strap secured to said block and having portions extending parallel to and over said face, means on said strap engaging the face to support the block with the plane of the strap in spaced relation to the face, a cover for said face and opening and apertured to expose said block, the under surface of said cover engaging said strap to press said means against said face, a flange surrounding said cover and means to clamp the edges of said cover flange against said body.

3. A mounting strap for use with a wiring device and a condulet comprising a unitary metal plate having an aperture to receive the neck of said device, means on said plate to attach it to said neck, down-turned flanges on the lateral edges of said plate, each flange having tangs extending from the edge thereof, each tang extending substantially parallel to the main portion of the plate and toward the opposite flange and then being turned parallel to its flange, whereby a notch is formed therein to engage over the corner of a side wall of a condulet.

4. A mounting strap for use with a wiring device and a condulet having an opening to receive the device and partially defined by spaced side walls, comprising a unitary metal plate having means to receive said device, down-turned flanges on the lateral edges of said plate, each flange having a portion thereof formed to engage both the front edge and the inner side of one of said side walls.

5. A wiring device and mounting assembly for use with a conventional condulet including, in combination, a wiring device including a block of insulation having a face adapted to be exposed through the condulet cover, mounting means secured to said block behind said face, said means including tangs, each adapted to engage two surfaces of said condulet at substantially right angles to each other to position the block in said condulet, and a surface on said means for engagement by the condulet cover.

6. A wiring fixture including, in combination, a hollow condulet body having side walls, a bottom and an open top, a pair of wiring devices in tandem in the hollow of said body each with a face extending out through said top, a separate supporting plate for each device secured thereto, each plate partly overlying the top edges of said side walls, means on each plate engaging the inner faces of said side walls, a flat cover superimposed on said plates and closing the open top of said condulet body, a pair of openings in said cover, each to expose one of said faces, a fastening screw for each of two diagonally opposite corners of said cover to secure it to the body, and a portion on each plate through which one of said screws passes.

MARK N. RUSSELL.